Nov. 30, 1971  E. W. ANTHON  3,623,844
INCUBATOR AND PROCESS TURNTABLE FOR CHEMICAL
ANALYSIS APPARATUS FOR MICRO SAMPLES
Filed July 17, 1969  2 Sheets-Sheet 1
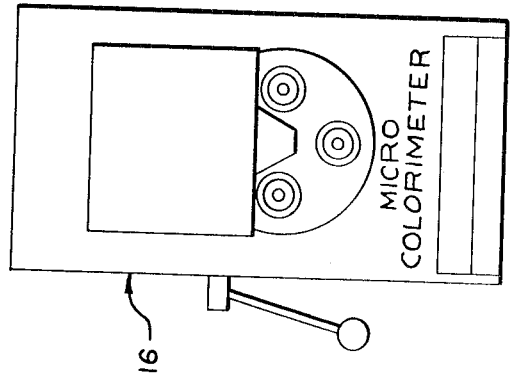
FIG. 1a
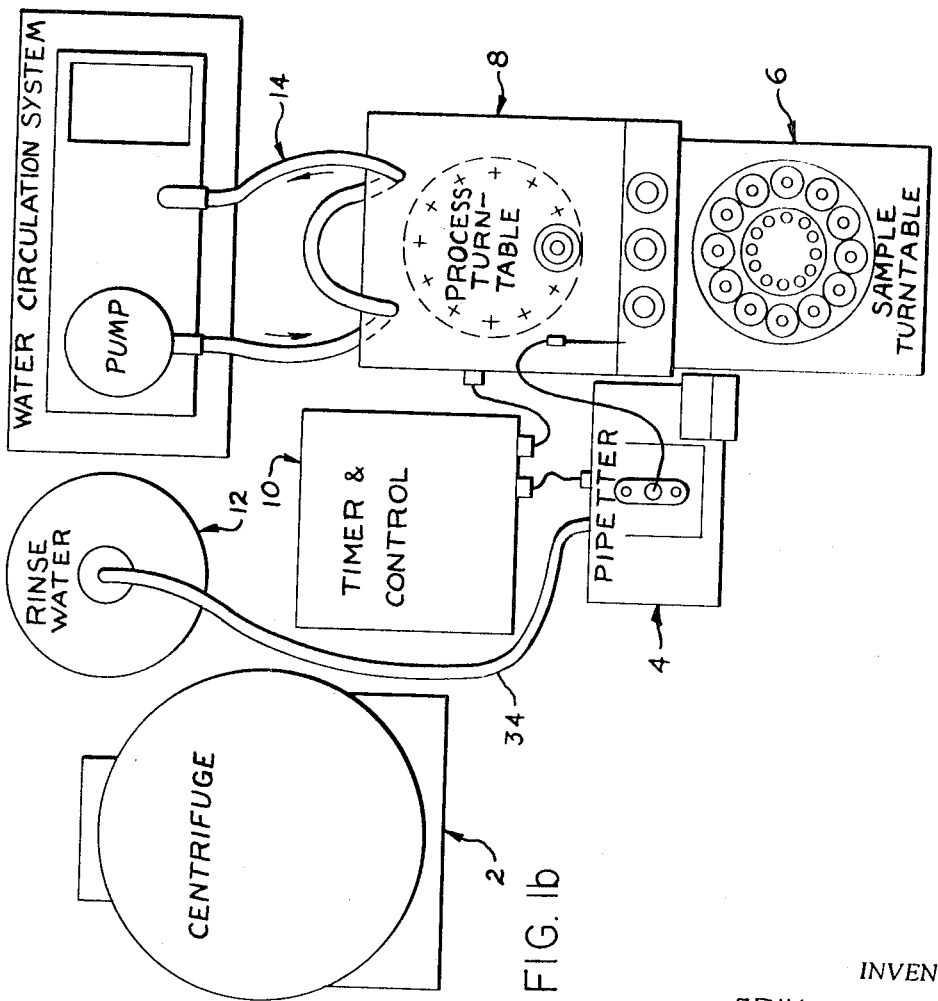
FIG. 1
FIG. 1b
INVENTOR.
ERIK W. ANTHON
BY
Robert J. Bird
ATTORNEY Nov. 30, 1971  E. W. ANTHON  3,623,844
INCUBATOR AND PROCESS TURNTABLE FOR CHEMICAL
ANALYSIS APPARATUS FOR MICRO SAMPLES
Filed July 17, 1969  2 Sheets-Sheet 2

INVENTOR.
ERIK W. ANTHON
BY
Robert J. Bird
ATTORNEY

United States Patent Office 3,623,844
Patented Nov. 30, 1971

3,623,844
INCUBATOR AND PROCESS TURNTABLE FOR CHEMICAL ANALYSIS APPARATUS FOR MICRO SAMPLES
Erik W. Anthon, Kensington, Calif., assignor to American Optical Corporation, Southbridge, Mass.
Filed July 17, 1969, Ser. No. 842,594
Int. Cl. B01f *3/12;* B01l *1/00;* G01n *31/00*
U.S. Cl. 23—253
2 Claims

ABSTRACT OF THE DISCLOSURE

A serum sample incubator and process turntable in which samples are disposed in an insulated and humidity-controlled atmosphere and agitated as they are rotated and indexed relative to an analysis apparatus.

BACKGROUND OF THE INVENTION

Figure 3:
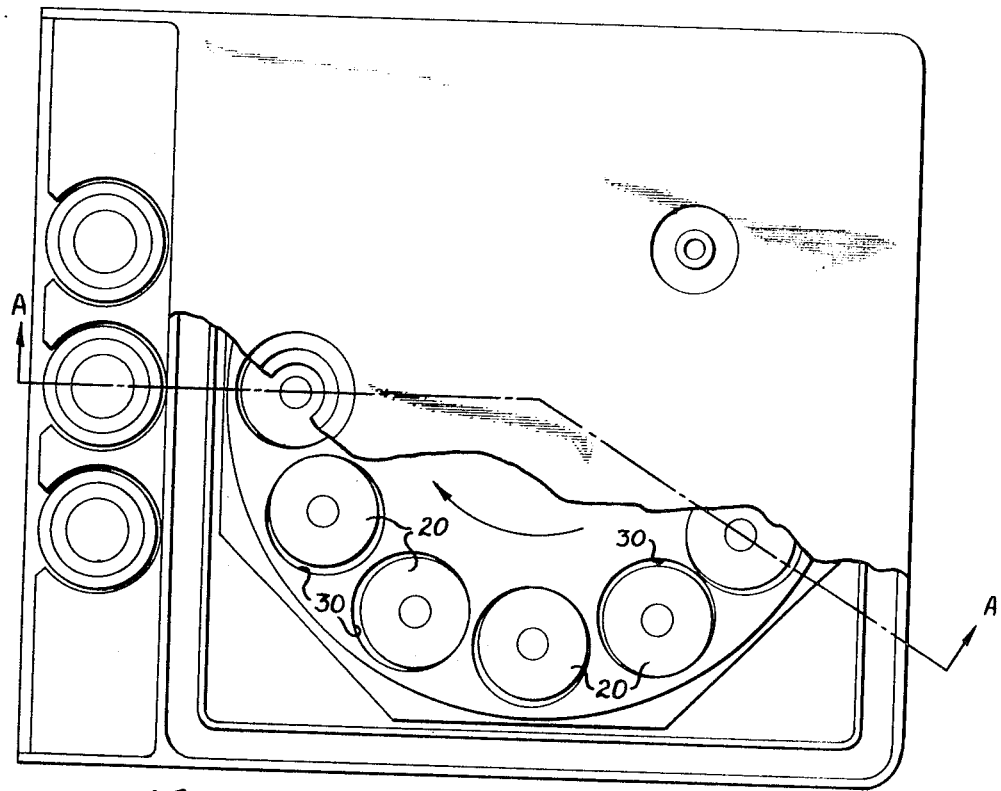

The present invention is related to automated chemical analysis apparatus and in particular to a combined apparatus for the sampling and analysis of very small amounts of liquid sample and reagent, hereinafter sometimes referred to as micro samples.

In many types of chemical analyses, involving a great number of samples of similar character, the repetitive performance of the chemical operations lends itself to automation. The use of automatic analyzing equipment greatly increases laboratory efficiency, economy, and has the further advantage of increasing accuracy of the analyses. Present automated chemistry systems are generally usable in connection with samples and reagents in macroscopic quantities, that is, in quantities of the general order of milliliters. The handling of such macroscopic samples has been attended by problems and solutions known to the prior art.

It has been found desirable to provide an automated chemistry system usable in connection with samples and reagents in micro quantities. The handling of such microscopic quantities of samples and reagents is attended by problems unknown to the prior art. The slightest amount of evaporation, for example, would have a much greater affect on a micro sample than would an equal amount of evaporation in a macroscopic sample. Also, the stirring or agitation of the samples and reagents must be provided for by some means other than a mechanical stirring rod.

Accordingly, it is an object of the present invention to provide a serum sample incubator and process turntable which is effective to prevent evaporation of the microscopic samples.

Another object is to provide a serum sample incubator and process turntable having provision for the physical mixing and agitation of the micro quantities of sample and reagent carried thereby.

Other objects, advantages and features of the present invention will become apparent from the following description thereof, taken in connection with the accompanying drawing.

SUMMARY OF THE INVENTION

The present invention is practiced in one form by a serum sample incubator and process turntable which is rotatably mounted relative to a ratchet or stepping motor, which rotates in small discrete steps. The turntable carries sample cups within an insulated and humidity-controlled atmosphere so as to prevent evaporation. During the rotation and indexing, one and only one sample at a time is exposed for handling and analysis by associated apparatus.

DRAWING

In the drawing:
FIG. 1 is an over-all view of a complete micro chemistry system showing the environment of which the present invention is a part; and
FIGS. 2 and 3 are a sectional elevation and a top plan view respectively of a serum sample incubator and process turntable according to the present invention.

DESCRIPTION

Referring now to FIGS. 1, 1a, and 1b, there is shown the over-all combination of elements which make up an automated analytical apparatus of which the present invention is a part. Included are a centrifuge 2, a pipetter 4, a sample turntable 6, an incubator and process turntable 8, a timer and control element 10, a rinse water source 12, a water circulation system 14 and a micro colorimeter 16.

Figure 2:
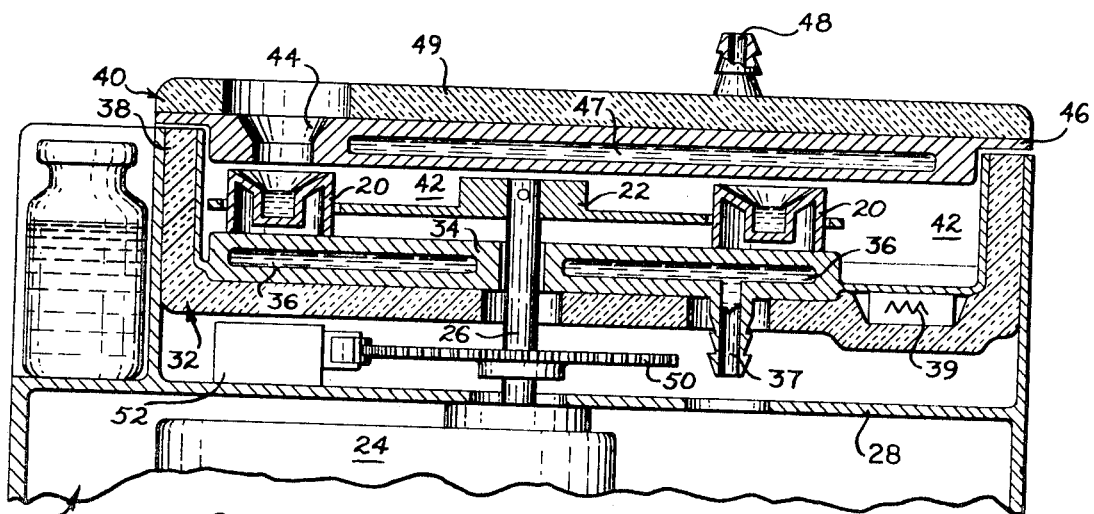

Referring now to FIGS. 2 and 3, an incubator and process turntable 8 is shown. Turntable 8 includes a plurality of individual sample cups 20 for the containment of serum samples. A drive disc 22 is operatively connected to a drive motor 24 by means of drive shaft 26, to which it is fixed. Motor 24 is fixedly mounted to a frame 28. A plurality of apertures 30, corresponding to the number of sample cups 20, is formed through drive disc 22. Sample cups 20 are disposed within the apertures 30, and are slidably supported atop a stationary platform member shown generally at 32. A removable cover plate, shown generally at 40, is positioned over sample cups 20 so that the cups are in a substantially closed incubation chamber. Cover plate 40 has only one opening 44 through which only one sample cup at a time becomes accessible.

An index disc 50 is also fastened on drive shaft 26, preferably outside of incubator chamber 42. The periphery of index disc 50 is in contact with the follower mechanism of an index switch 52. The periphery of disc 50 has a number of recesses by which the follower of switch 52 is caused to actuate the switch on and off. Switch 52, in turn, controls drive motor 24 which is of a suitable type having the following characteristics: slow rotation, very little inertia and instantaneous stopping ability, and rotation in small discrete steps (120 steps per second) as distinguished from smooth rotation. It thus acts as a combined driver and vibrator.

The aperatures 30 in drive disc 22 are made slightly larger than the sample cups 20. This leaves a clearance around each cup and the stepwise motion of the drive disc causes each cup to vibrate or agitate as motor 24 rotates. This motion agitates and mixes the contents of the sample cups 20, such mixing being important for accurate chemistry.

Switch 52 provides accurate indexing of the incubator and process turntable mechanism 8 relative to its associated apparatus.

The afore-mentioned platform member 32 is preferably a compound member including a pair of horizontal members 34 defining between them a water jacket 36 which communicates through suitable inlet (or outlet) passages 37 which are operatively connected to the water circulation system 14 (FIG. 1). It will be understood that a single passage 37 is shown but that another would be located in a different position communicating with water jacket 36 so that there would be at least one inlet and one outlet passage 37. Platform member 32 also preferably includes a jacket of insulation 38 disposed around the sides of incubation chamber 42 and beneath members 34 serving as the base thereof. An electric heater 39 also forms a part of platform member 32 and is disposed within insulation jacket 38 in contact with one of members 34.

Cover plate 40 preferably is similarly composed of parallel horizontal members 46 together defining a water jacket 47 therebetween. Water jacket 47 also communicates by way of an inlet and an outlet passage 48 with the water circulation system 14. A layer of insulation 49 is disposed atop members 46, opening 44 traversing both members 46 and insulation 49.

By means of the insulation and the controlled water temperature in system 14, the temperature within chamber 42 is well controlled and maintained. The atmosphere within chamber 42 is furthermore kept fully saturated with water vapor. A pool of water is maintained in chamber 42 and by means of heater 39, its temperature is kept slightly above the ambient temperature within the chamber. The fully saturated air in chamber 42 prevents evaporation from the sample cups and provides rapid heat transfer to the cups and their contents. Condensation and thereby release of heat will occur on any cold object brought into the chamber. Dilution resulting from such condensation appears to be of little consequence, but the rapid heat transfer resulting from it appears to be very effective.

The present invention provides a serum sample incubator and process turntable of improved characteristics. The minimization or elimination of evaporation by controlling temperature and humidity and the effective stirring by means of agitation, enable this turntable to be an effective incubator of samples in micro quantities.

It may occur to others of ordinary skill in the art to make modifications of the present invention which will remain within the concept and scope thereof and not constitute a departure therefrom. Accordingly, it is intended that the invention be not limited by the details in which it has been described, but that it encompass all within the purview of the following claims.

What is claimed is:

1. A serum incubator and process turntable including:
a stationary frame supporting a platform member and a drive motor,
a drive shaft extending from said motor vertically through said platform member and fastened to a coaxial drive disc, said drive disc defining a plurality of cup openings for the accommodation of sample cups resting slidably on said platform in a circular array,
said drive shaft further fastened to a position indicator which is in turn operatively connected to said drive motor,
a peripheral insulated wall extending around and upward from said platform member,
a removable cover plate defining a single opening in registry one at a time with the cup openings through said drive disc,
said platform wall and cover plate substantially defining an incubation chamber,
said motor being rotatable in discrete steps to cause vibration of the cups and the agitation of the samples within said cups, and
means to control the humidity and temperature within said incubation chamber, including a quantity of water within said incubation chamber and an electric means to maintain the temperature thereof higher than that of the atmosphere within said chamber, and said means to control the temperature includes a water jacket defined by said cover plate and a water jacket defined by said platform, said water jackets including inlet and outlet conduits in communication with a thermostated water circulation system 2. A serum incubator and process turntable including:
a stationary frame including a horizontally disposed platform,
a motor driven shaft extending vertically through said platform and fastened to a drive disc, said drive disc defining a plurality of openings in circular array, for the accommodation of sample cups resting on said platform,
a position indicator and controller operatively connected to said drive disc and to said motor,
a stationary cover plate defining a single aperture, disposed over said openings and in registry with a single one thereof at a time,
side walls extending vertically upward from said platform defining therewith an incubation chamber,
said platform and said cover plate each defining a water jacket therewithin and including inlet and outlet conduits in communication with said water jackets and with a thermostated water circulation system,
the incubation chamber formed by said platform and walls adapted to contain a quantity of water, and means to keep said quantity of water at a temperature higher than the temperature of the atmosphere within said chamber,
said motor being a vibrator, rotating said drive disc in discrete increments.

References Cited

UNITED STATES PATENTS

| 1,664,840 | 4/1928 | Wermine | 23—253 X |
| 2,233,372 | 2/1941 | Baker | 23—230 B X |
| 2,550,067 | 4/1951 | Hewson | 23—253 |
| 2,710,715 | 6/1955 | Gorham. | |
| 2,899,858 | 8/1959 | Stott | 23—253 |

JOSEPH SCOVRONEK, Primary Examiner

U.S. Cl. X.R.

23—259; 141—79, 82; 312—31, 305